(12) United States Patent
Wang et al.

(10) Patent No.: US 12,330,492 B2
(45) Date of Patent: Jun. 17, 2025

(54) ALUMINUM ALLOY FRAME AND POWER CELL COMPARTMENT INTEGRATION STRUCTURE

(71) Applicant: Jilin University, Changchun (CN)

(72) Inventors: Dengfeng Wang, Changchun (CN); Zifeng Zhang, Changchun (CN)

(73) Assignee: Jilin University, Changchun (CN)

( * ) Notice: Subject to any disclaimer, the term of this patent is extended or adjusted under 35 U.S.C. 154(b) by 426 days.

(21) Appl. No.: 18/096,744

(22) Filed: Jan. 13, 2023

(65) Prior Publication Data

US 2023/0339304 A1    Oct. 26, 2023

(30) Foreign Application Priority Data

Apr. 21, 2022 (CN) .......................... 202210422279.7

(51) Int. Cl.
*B60K 1/04* (2019.01)
*H01M 50/224* (2021.01)
*H01M 50/244* (2021.01)
*H01M 50/249* (2021.01)

(52) U.S. Cl.
CPC ............. *B60K 1/04* (2013.01); *H01M 50/224* (2021.01); *H01M 50/244* (2021.01); *H01M 50/249* (2021.01); *B60K 2001/0405* (2013.01); *H01M 2220/20* (2013.01)

(58) Field of Classification Search
CPC ............. B60K 1/04; B60K 2001/0405; H01M 50/249; H01M 50/244; H01M 50/224
See application file for complete search history.

(56) References Cited

U.S. PATENT DOCUMENTS

| 10,553,987 | B2 * | 2/2020 | Fehner | H01R 13/5213 |
| 10,707,538 | B2 * | 7/2020 | Unveren | B60L 3/0007 |
| 10,988,014 | B2 * | 4/2021 | Baccouche | B60K 1/04 |
| 2024/0157816 | A1 * | 5/2024 | Stawiarski | B60L 50/64 |

* cited by examiner

*Primary Examiner* — John D Walters
(74) *Attorney, Agent, or Firm* — Brian J. Colandreo; Jeffrey T. Placker; Holland & Knight LLP

(57) ABSTRACT

The present disclosure discloses an aluminum alloy frame and power cell compartment integration structure, including an aluminum alloy frame and a power cell compartment. The aluminum alloy frame includes left and right longitudinal beams and several cross beams; the power cell compartment includes left and right supports, a bottom plate, a framework, an upper cover, and a charging port; the left and right supports, the upper cover and the bottom plate are respectively mounted on two side surfaces, a top and a bottom of the framework; a power cell is assembled in the framework of the power cell compartment; the charging port connected to the power cell is formed in the framework; and the power cell compartment is detachably assembled between the left and right longitudinal beams of the aluminum alloy frame through the left and right supports on the two side surfaces of the framework.

7 Claims, 5 Drawing Sheets

ALUMINUM ALLOY FRAME AND POWER CELL COMPARTMENT INTEGRATION STRUCTURE

CROSS-REFERENCE TO RELATED APPLICATION

This patent application claims the benefit and priority of Chinese Patent Application No. 202210422279.7, filed with the China National Intellectual Property Administration on Apr. 21, 2022, the disclosure of which is incorporated by reference herein in its entirety as part of the present application.

TECHNICAL FIELD

The present disclosure relates to the technical field of new energy automobile design and manufacturing, in particular to an aluminum alloy frame and power cell compartment integration structure.

BACKGROUND

Against the background of global energy shortage and increasing greenhouse gas emission, the demand for electrification and low-carbon in the automobile industry is more urgent. Developing electric commercial vehicles and achieving structural lightweight are important technical demands for the automotive industry in China to achieve the carbon peaking and carbon neutrality goals. A frame is an important chassis bearing component and mounting base for a commercial vehicle. At present, the frames of medium and heavy electric commercial vehicles in China mainly adopt high-strength steel with a tensile strength of 500 MPa-750 MPa. Longitudinal and cross beam structures of the frame are manufactured through a rolling or stamping forming process. Although the strength level of steel for the longitudinal beam of the frame has gradually increased from 510 MPa to 700 MPa in recent years, due to a large material density of the steel, it is still difficult to achieve structural lightweight of the frame. Aluminum alloy is a material with a low density and high specific strength and stiffness, and can be formed in diversified forming ways. In recent years, the aluminum alloy has been applied to the frame structures of light trucks and semitrailers, and has achieved a remarkable effect of reducing the weight of about 30%. At present, some enterprises also develops aluminum alloy frames for lightweight tractors and trucks and assembles the frames on automobiles for exhibition, but these frames have not been put into mass production and application. The aluminum alloy frames of these exhibition automobiles completely adopt longitudinal and transverse beam section structures of steel frames, and are simple replacements of materials and structures. No brand-new longitudinal and transverse beam section structure for an aluminum alloy frame of a commercial vehicle is designed and developed according to the characteristics of an aluminum alloy material and the characteristics of a forming process. At present, domestic medium and heavy electric commercial vehicles are electric vehicles refitted from traditional fuel vehicles. Due to a large volume of a power cell compartment, it is difficult to find a reasonable position to mount the power cell compartment. Most of the power cell compartments are vertically mounted on the frame on a rear side of a cab or hung on left and right sides of the frame behind a front axle. In the scheme that the frame is mounted on the rear side of the cab, the space of a rear compartment will be occupied, the position of the center of mass of the vehicle is raised, and the handling stability and driving safety of the entire vehicle are reduced. In the scheme that the frame is hung on the left and right sides of the frame behind the front axle, the mounting space for a fuel tank, an exhaust muffler and other assemblies will be occupied, which brings challenges to the general layout of the entire vehicle. In a case of a side collision accident between the electric commercial vehicle and other vehicles, this mounting manner will endanger the safety of a power cell system.

SUMMARY

The present disclosure aims to provide an aluminum alloy frame and power cell compartment integration structure, so as to solve the above-mentioned problems in the existing technology. This structure is a structural matching form for a frame and power cell compartment of a brand-new architecture electric commercial vehicle, and is applicable to a commercial vehicle where it is not necessary to mount an electric drive bridge, an electric transmission system and a distributed drive electric wheel of a power transmission system component at a front end of a frame. This structure can significantly reduce the height of the center of mass of the electric commercial vehicle, improve the distribution of an axle load, better protect a power cell system, improve the handling stability and driving safety of the entire vehicle, facilitates charging and cell replacement, and has an important leading function of promoting the electric commercial vehicle in China to be developed from a refitted carrying architecture to a brand-new architecture.

In order to achieve the above-mentioned objective, the present disclosure provides the following scheme: The present disclosure provides an aluminum alloy frame and power cell compartment integration structure, including an aluminum alloy frame and a power cell compartment, wherein the aluminum alloy frame includes left and right longitudinal beams and several cross beams; the several cross beams are arranged between the left and right longitudinal beams in a spacing manner; the number and structural forms of the cross beams are made to be different structural forms according to a connection manner of all assembly parts and a frame and a carrying requirement; the power cell compartment includes left and right supports, a bottom plate, a framework, an upper cover, and a charging port; the left and right supports, the upper cover and the bottom plate are respectively mounted on two side surfaces, a top and a bottom of the framework; a power cell is assembled in the framework of the power cell compartment; the charging port connected to the power cell is formed in the framework; a width of the power cell compartment is consistent with an internal width between the left and right longitudinal beams of the aluminum alloy frame; and the power cell compartment is detachably assembled between the left and right longitudinal beams of the aluminum alloy frame through the left and right supports on the two side surfaces of the framework.

Preferably, the left and right longitudinal beams of the aluminum alloy frame are inverted H-shaped sections; front ends of the left and right longitudinal beams are outwards bent to be broadened, so that the aluminum alloy frame is formed into a shape with a wider front part and a narrower rear part to match a wider cell compartment; and the power cell compartment is mounted in the broadened area of the aluminum alloy frame.

Preferably, when the power cell compartment is required to be placed between a front axle and a second axle of a commercial vehicle, the left and right longitudinal beams of the aluminum alloy frame located between the front axle and the second axle are required to be outwards bent to be broadened, so that the aluminum alloy frame is formed into a shape with two narrower ends and a wider middle part; and the power cell compartment is mounted in the broadened area of the aluminum alloy frame.

Preferably, for an electric truck, the cross beams of the aluminum alloy frame includes a front end beam, a lower cross beam, a first cross beam, a second cross beam, a round girder I, a round girder II, a third cross beam, a fourth cross beam, a rear end beam, and connecting members; the front end beam is groove-shaped; the lower cross beam is a hollow ribbed plate; the first cross beam is in an inverted H shape with an upper right flange moving down; the second cross beam is in an inverted H shape; the round girder I and the round girder II are concave beams with ribs between an upper plate and a lower plate; the third cross beam and the fourth cross beam are inverted H-shaped beams; the rear end beam is a groove-shaped beam; and the connecting members are groove-shaped members.

Preferably, the left and right longitudinal beams and the various cross beams of the aluminum alloy frame are all manufactured by performing extrusion forming on aluminum alloy.

Preferably, the left and right longitudinal beams and the various cross beams of the aluminum alloy frame are connected through the connecting members or are directly screwed or riveted together.

Preferably, when the power cell compartment is located at the front end of the aluminum alloy frame, the power cell compartment further includes a pull handle; and the pull handle is used for forwards pulling out the power cell compartment from the position between the left and right longitudinal beams of the aluminum alloy frame for cell replacement.

Compared with the present disclosure, the following beneficial technical effects are achieved in the existing art.

The aluminum alloy frame and power cell compartment integration structure in the present disclosure is a structural matching form for a frame and power cell compartment of a brand-new architecture electric commercial vehicle. This structure can significantly reduce the height of the center of mass of an electric commercial vehicle, improve the distribution of an axle load, better protect a power cell system, improve the handling stability and driving safety of the entire vehicle, facilitates charging and cell replacement operations to save the cell replacement time of a power cell, and has an important leading function of promoting the electric commercial vehicle in China to be developed from a refitted carrying architecture to a brand-new architecture.

The longitudinal and cross beams of the aluminum alloy frame and the connecting members are all manufactured by extrusion forming, so that the expense of a forming mold of the frame can be greatly reduced, the manufacturing effect is enhanced, the manufacturing cost is saved, and the frame is structurally light in weight.

The left and right longitudinal beams and the various cross beams of the aluminum alloy frame are all bolted or riveted, so that a decrease in the structural strength and fatigue life of the parts caused by a heat-affected zone generated by welding of the aluminum alloy parts is avoided.

BRIEF DESCRIPTION OF THE DRAWINGS

In order to describe embodiments of the present disclosure or technical solutions in the existing art more clearly, drawings required to be used in the embodiments will be briefly introduced below. It is apparent that the drawings in the descriptions below are only some embodiments of the present disclosure. Those of ordinary skill in the art also can obtain other drawings according to these drawings without making creative work.

Figure 1:
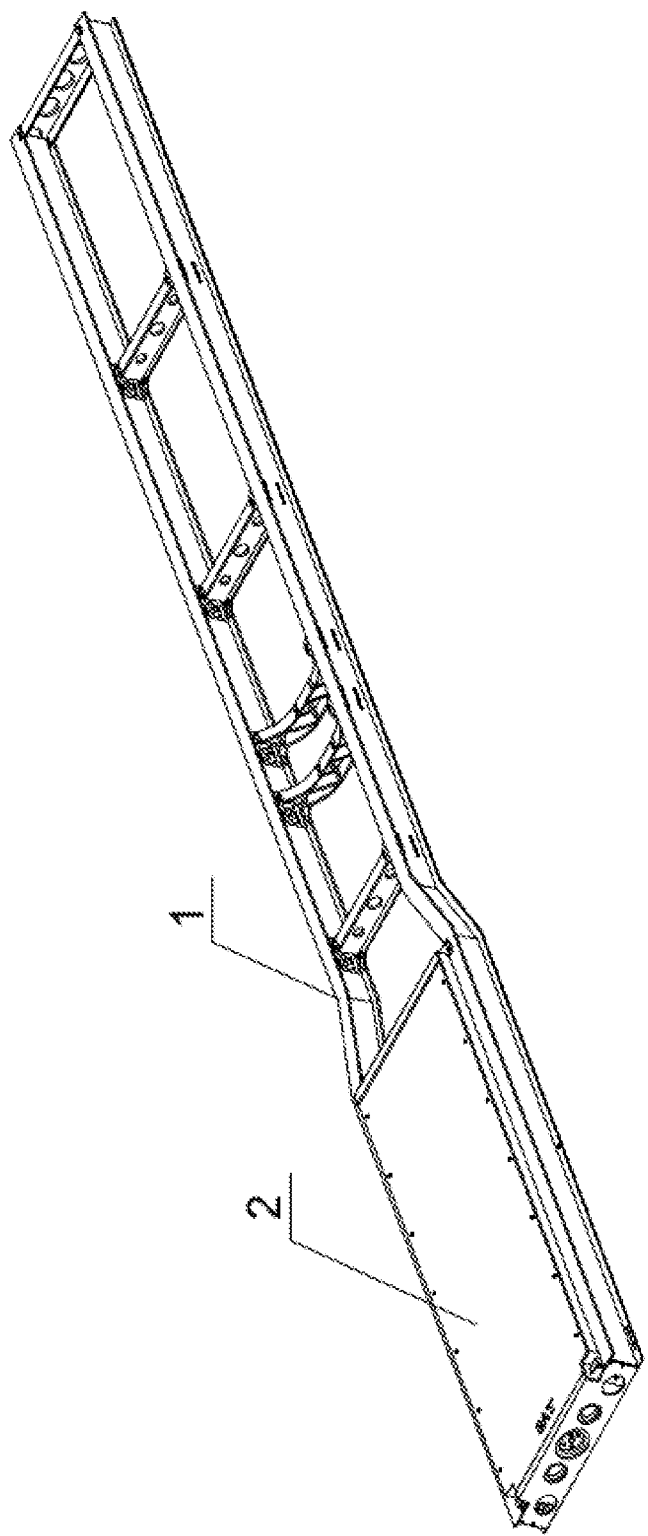
FIG. 1 is a schematic diagram of an aluminum alloy frame and power cell compartment integration structure according to Embodiment I.

In the drawings: 1: aluminum alloy frame; 101: left and right longitudinal beams; 102: front end beam; 103: lower cross beam; 104: first cross beam; 105: second cross beam; 106: round girder I; 107: round girder II; 108: third cross beam; 109: fourth cross beam; 110: rear end beam; 111: connecting member; 2: power cell compartment; 21: left and right supports; 22: bottom plate; 23: framework; 24: upper cover; 25: pull handle; 26: charging port; 3: front axle; 4: transmission shaft; 5: drive axle; and 6: motor and reducer.

DETAILED DESCRIPTION OF THE EMBODIMENTS

The technical solutions in the embodiments of the present disclosure will be described clearly and completely below in combination with the accompanying drawings of the embodiments of the present disclosure. Apparently, the described embodiments are only part of the embodiments of the present disclosure, not all embodiments. All other embodiments obtained by those of ordinary skill in the art based on the embodiments in the present disclosure without creative work shall fall within the protection scope of the present disclosure.

The present disclosure aims to provide an aluminum alloy frame and power cell compartment integration structure, so as to solve the above-mentioned problems in the existing technology. This structure is a structural matching form for a frame and power cell compartment of a brand-new architecture electric commercial vehicle, and is applicable to a commercial vehicle where it is not necessary to mount an electric drive bridge, an electric transmission system and a distributed drive electric wheel of a power transmission system component at a front end of a frame. This structure can significantly reduce the height of the center of mass of the electric commercial vehicle, improve the distribution of an axle load, better protect a power cell system, improve the handling stability and driving safety of the entire vehicle, facilitates charging and cell replacement, and has an important leading function of promoting the electric commercial vehicle in China to be developed from a refitted carrying architecture to a brand-new architecture.

In order to make the above-mentioned purposes, characteristics, and advantages of the present disclosure more obvious and understandable, the present disclosure is further described in detail below with reference to the accompanying drawings and specific implementations.

The present disclosure provides an aluminum alloy frame and power cell compartment integration structure, which includes an aluminum alloy frame 1 and a power cell compartment 2. The aluminum alloy frame 1 includes left and right longitudinal beams 101 and several cross beams. The number and structural forms of the cross beams are made to be different structural forms according to connection of all assembly parts and a frame and a carrying requirement. An electric truck usually includes a front end beam 102, a lower cross beam 103, a first cross beam 104, a second cross beam 105, a round girder I 106, a round girder II 107, a third cross beam 108, a fourth cross beam 109, a rear end beam 110, and connecting members 111. The power cell compartment 2 mainly includes left and right supports 21, a bottom plate 22, a framework 23, an upper cover 24, a pull handle 25, and a charging port 26. A width of the power cell compartment 2 is consistent with an internal width between the left and right longitudinal beams 101 of the aluminum alloy frame 1. The left and right supports 21 are mounted on two side surfaces of the framework 23. Five holes are formed in each of the left and right supports 21 and correspond to thread holes in inner lower flanges of front ends of the left and right longitudinal beams 101 of the aluminum alloy frame 1. The power cell compartment 2 and the aluminum alloy frame 1 are connected and fixed by bolts.

The aluminum alloy frame 1 is made of a thermally treated and strengthened aluminum alloy material (such as 6082-T6). The left and right longitudinal beams 101 are extruded to form inverted H-shaped sections and then bent into a shape with a wider front part and a narrower rear part. The various cross beams of the aluminum alloy frame 1 are extruded into different sectional shapes according to their mounting, supporting and carrying requirements. The front end beam 102 is groove-shaped; the lower cross beam 103 is a two-layer ribbed plate; the first cross beam 104 is in an inverted H-shaped beam with an upper right flange moving down; the second cross beam 105 is in an inverted H shape; the round girder I 106 and the round girder II 107 are concave beams with ribs between an upper plate and a lower plate; the third cross beam 108 and the fourth cross beam 109 are inverted H-shaped beams; the rear end beam 110 is a groove-shaped beam; and the connecting members 111 are groove-shaped members and are then machined into desired shapes. All the parts of the frame are treated using a T6 thermal treatment process to improve the structural performances of the longitudinal and cross beams and the connecting members of the frame. The left and right longitudinal beams 101 and the various cross beams of the aluminum alloy frame of the electric commercial vehicle and the connecting members 111 are all manufactured by an aluminum alloy extrusion forming process, so that the expense of a forming mold of the frame can be greatly reduced, the manufacturing cost is saved, and the frame is structurally light in weight.

The front ends of the left and right longitudinal beams 101 of the aluminum alloy frame 1 are outwards bent to be broadened to form a shape with a wider front part and a narrower rear part, so that there is an enough space at the front ends to mount a larger power cell compartment 2. The power cell compartment 2 is mounted between the left and right longitudinal beams 101 at the front end of the aluminum alloy frame 1. The width of the power cell compartment 2 is consistent with the internal width between the left and right longitudinal beams 101 of the aluminum alloy frame 1. The left and right supports 21 are mounted on the two side surfaces of the framework 23 of the power cell compartment 2. There are five holes in each of the left and right brackets 21, which correspond to the threaded holes in the inner lower flanges of the front ends of the inverted H-shaped left and right longitudinal beams 101. The power cell compartment 2 and the aluminum alloy frame 1 are connected and fixed by bolts. This can effectively protect the power cell system, balance the distribution of an axle load of the vehicle, reduce the height of the center of mass of the entire vehicle, and improve the handling stability and driving safety of the entire vehicle.

The left and right longitudinal beams 101 and the various cross beams of the aluminum alloy frame 1 are all connected using the connecting members 111 or all bolted or riveted, so that a decrease in the structural strength and fatigue life of the parts caused by a heat-affected zone generated by welding of the aluminum alloy parts is avoided.

During use, an air inlet grille of the cab of the commercial vehicle can be opened. A charger head is threaded through a hole in the middle of the front end beam 102 of the aluminum alloy frame 1 and plugged to the charging port 26 of the power cell compartment 2 for charging. Or, the connecting bolts between the power cell compartment 2 and the aluminum alloy frame 1 are removed, and the pull handle 25 at the front end of the power cell compartment 2 is grabbed to pull out the power cell compartment 2 from the front end of the aluminum alloy frame 1 for cell replacement. After the cell replacement is completed, the power cell compartment 2 is pushed to be connected and fixed with the aluminum alloy frame 1, the power cell compartment can be put into use, which greatly facilitates the charging and cell replacement operations of the electric commercial vehicle.

Embodiment I

Figure 2:
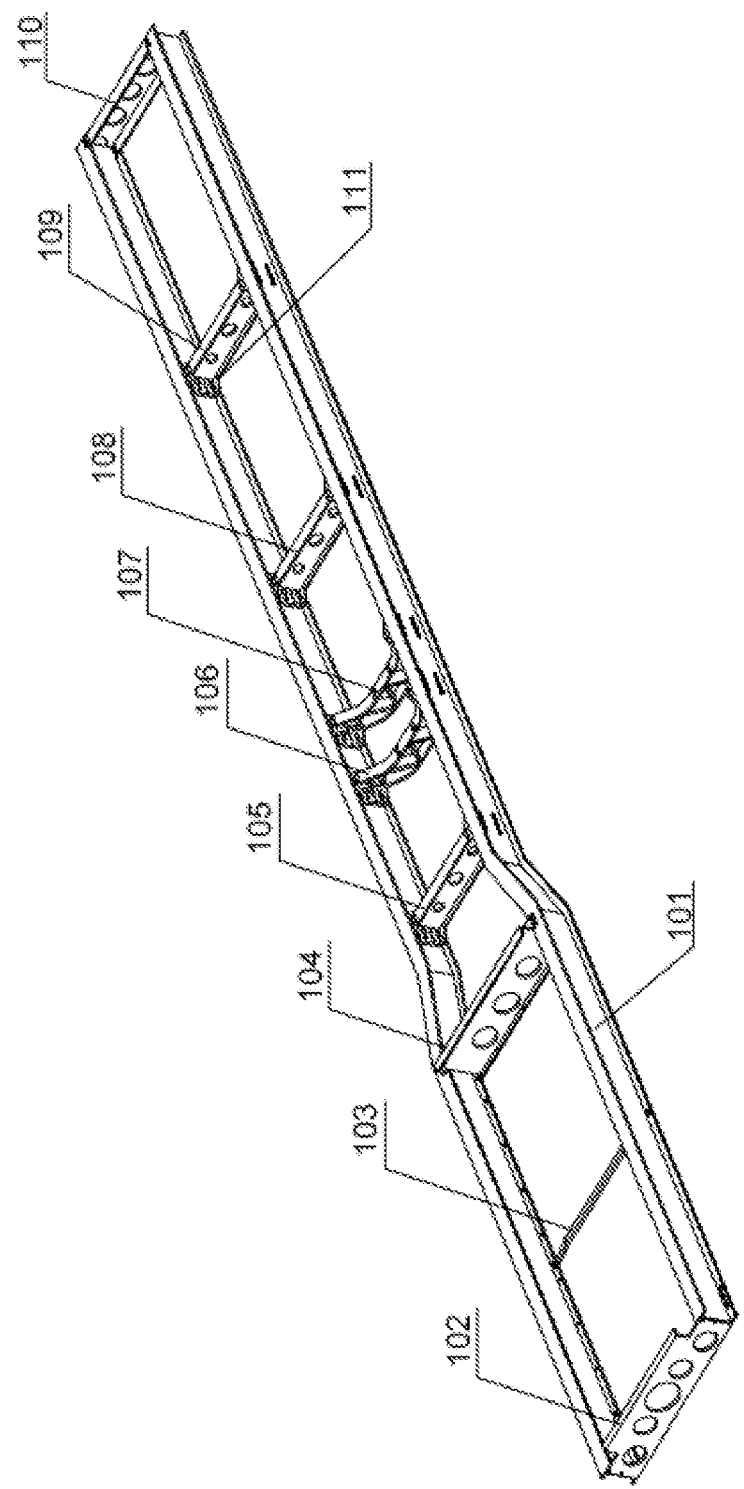
FIG. 2 is a structure of an aluminum alloy frame in Embodiment I.
Figure 3:
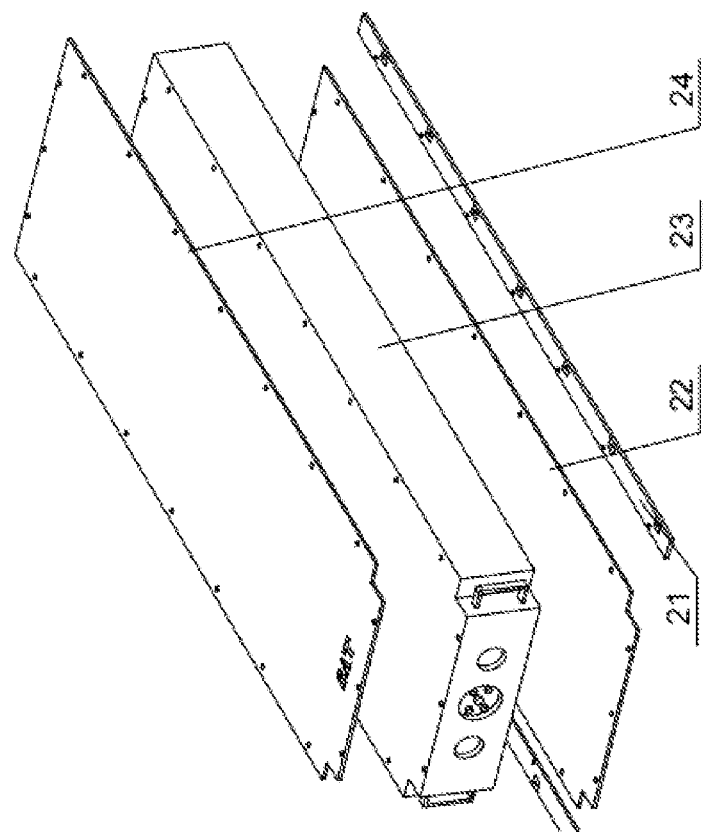
FIG. 3 is a structure of a power cell compartment.
Figure 3:
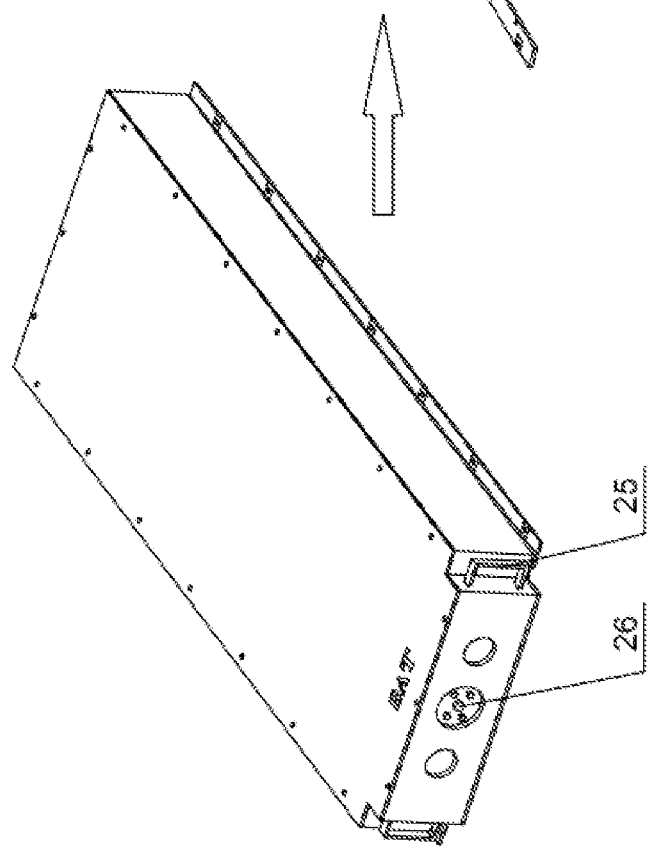

As shown in FIG. 1 to FIG. 4, according to an integration structure of an aluminum alloy frame 1 and a power cell compartment 2 of a certain electric truck with a full mass of 8 tons, this truck adopts an electric transmission system, so that a transmission shaft is shortened, and a driving motor and a reducer are moved backwards. An extremely large space is reserved at a front end of the aluminum alloy frame 1. In the present disclosure, the power cell compartment 2 is arranged at the front end of the aluminum alloy frame 1 by using this space. In order to mount power cells as many as possible and ensure that the electric truck has a sufficient dynamic property and endurance mileage, the front end of the aluminum alloy frame 1 is broadened towards two sides to reserve a larger space for integrating the power cell compartment 2. The aluminum alloy frame 1 is composed of left and right longitudinal beams 101, a front end beam 102, a lower cross beam 103, a first cross beam 104, a second cross beam 105, a round girder I 106, a round girder II 107, a third cross beam 108, a fourth cross beam 109, a rear end beam 110, and various connecting members 111, as shown in FIG. 2. The power cell compartment 2 mainly includes left and right supports 21, a bottom plate 22, a framework 23, an upper cover 24, a pull handle 25, and a charging port 26, as shown in FIG. 3.

Figure 4:
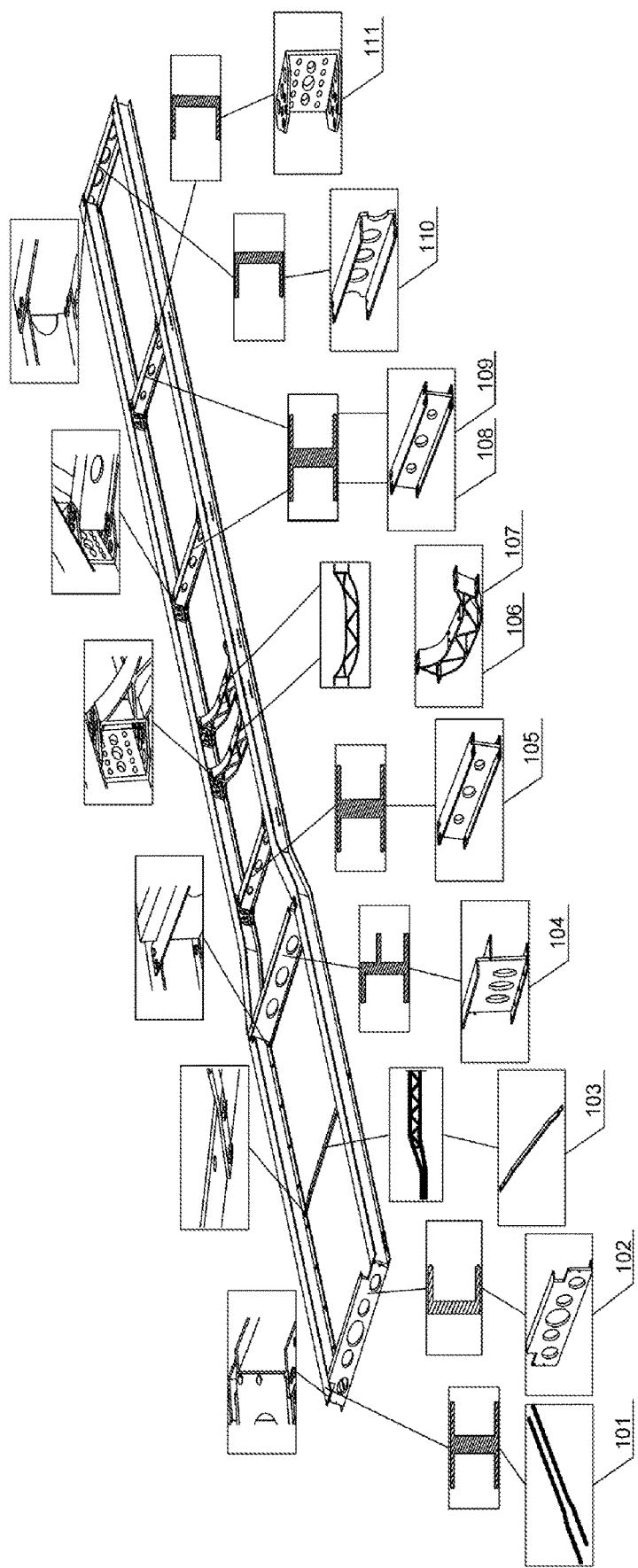
FIG. 4 is a schematic diagram of structures and connections of sections of longitudinal and cross beams of the aluminum alloy frame and parts.

The aluminum alloy frame of the electric truck is made of a thermally treated and strengthened aluminum alloy 6082-T6. The left and right longitudinal beams 101 are extruded to form inverted H-shaped sections and then bent into a shape with a wider front part and a narrower rear part, and are machined into a desired structural size. The number of the cross beams of the frame is determined according to the connection between the various assembly parts and the frame and a carrying requirement, and the cross beams are designed into different structural forms. The front end beam 102 is extruded to be groove-shaped; the lower cross beam 103 is extruded to be a two-layer ribbed plate; the first cross beam 104 is extruded to be in an inverted H-shaped beam with an upper right flange moving down; the second cross beam 105 is extruded to be an inverted H shape; the round girder I 106 and the round girder II 107 are extruded to be concave beams with ribs between an upper plate and a lower plate; the third cross beam 108 and the fourth cross beam 109 are extruded to be inverted H-shaped beams; the rear end beam 110 is extruded to be a groove-shaped beam; and the connecting members 111 are extruded to be groove-shaped members and are then machined into desired shapes. A T6 thermal treatment process is used to improve the structural performances of the longitudinal and cross beams and the connecting members 111 of the frame, as shown in FIG. 4. By the extrusion forming manufacturing process, the expense of a forming mold of the frame can be greatly reduced, the manufacturing effect is enhanced, the manufacturing cost is saved, and the frame is structurally light in weight.

During assembling of the frame, the connecting members 111 between the second cross beam 105, the round girder I 106, the round girder II 107, the third cross beam 108, as well as the fourth cross beam 109, and the left and right longitudinal beams 101 of the aluminum alloy frame 1 are riveted to corresponding positions of the frame; the lower cross beam 103, the first cross beam 104, the second cross beam 105, the round girder I 106, the round girder II 107, the third cross beam 108, the fourth cross beam 109, and the rear end beam 110 are connected to the left and right longitudinal beams 101 of the aluminum alloy frame 1 by bolts directly or through the connecting members 111; the power cell compartment 2 is pushed from the front end of the aluminum alloy frame 1 into an area between the left and right longitudinal beams 101 and the first cross beam 104; the left and right supports 21 of the power cell compartment 2 are connected to the inner lower flanges of the left and right longitudinal beams 101 by bolts; and finally, the front end beam 102 is connected between the left and right longitudinal beams 101 at the front end of the aluminum alloy frame 1 by bolts to obtain the integration structure of the aluminum alloy frame 1 and the power cell compartment 2. In this assembling manner of directly screwing or riveting the longitudinal and cross beams of the aluminum alloy frame 1 to the power cell compartment 2, so that the problem of a decrease in the structural strength and fatigue life of the parts caused by a heat-affected zone generated by mutual welding of the aluminum alloy parts is avoided.

During use, an air inlet grille of the cab of the commercial vehicle can be opened. A charger head is threaded through a hole in the middle of the front end beam 102 and plugged to the charging port 23 of the power cell compartment 2 for charging. Or, the connecting bolts between the power cell compartment 2 and the aluminum alloy frame 1 are removed, and the pull handle 25 at the front end of the power cell compartment 2 is grabbed to pull out the power cell compartment 2 from the front end of the aluminum alloy frame 1 for cell replacement. After the cell replacement is completed, the power cell compartment 2 is pushed to be connected and fixed with the aluminum alloy frame 1, the power cell compartment can be put into use, which greatly facilitates the charging and cell replacement operations of the electric commercial vehicle.

Embodiment II

Figure 5:
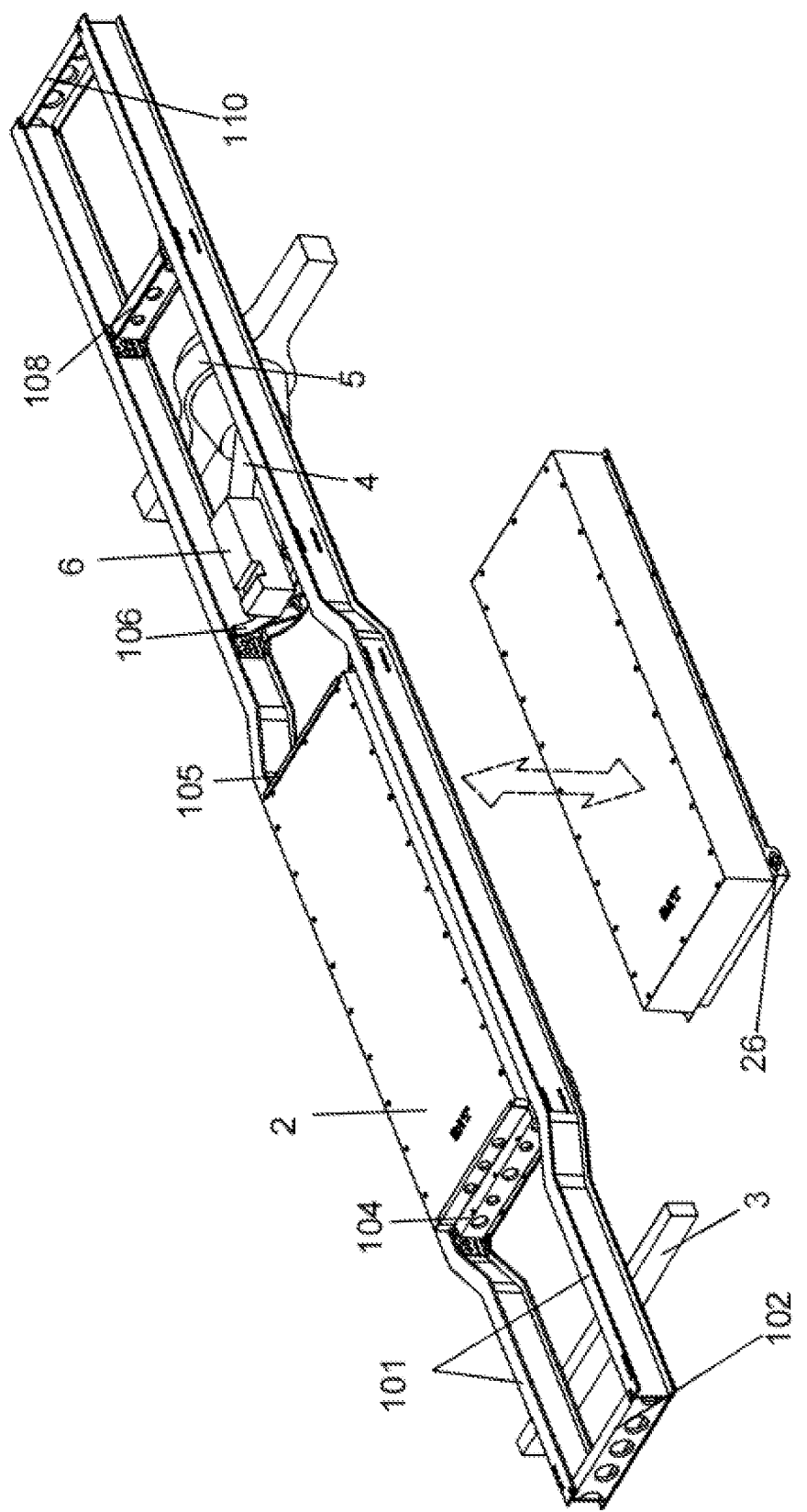
FIG. 5 is an arrangement diagram of an aluminum alloy frame and a power cell compartment in Embodiment II.

As shown in FIG. 5, this embodiment provides another integration scheme for an aluminum alloy frame and power cell compartment integration structure for an electric truck. The power cell compartment 2 is placed between the left and right longitudinal beams 101 of the aluminum alloy frame 1 between a front axle and a second axle of the truck, and the left and right longitudinal beams 101 of the aluminum alloy frame 1 between the front axle and the second axle are outwards bent to be broadened, so as to mount a larger power cell compartment 2. During the mounting of the power cell component 2, the power cell component 2 is placed between the front axle and the second axle from the side surface of the entire vehicle and then is moved to a position between the front axle and the second axle of a chassis; the power cell compartment is raised from bottom to top and mounted at a position between the first cross beam 104 and the second cross beam 105 between the left and right longitudinal beams 101; and the bottoms of the left and right supports 21 of the power cell compartment 2 are then connected to the inner lower flanges of the left and right longitudinal beams 101 by bolts. During use, the power cell compartment can be charged through the charging port in a left lower side of the front end of the power cell compartment. During cell replacement, the connecting bolts between the power cell compartment 2 and the left and right longitudinal beams 101 of the aluminum alloy frame 1 are loosened, and the power cell compartment 2 is downwards detached. The power cell compartment 2 is removed from the side surface for cell replacement.

For a heavy electric truck, when a larger power cell compartment is required, the two power cell compartments of Embodiment I and Embodiment II can be simultaneously mounted at corresponding positions of the frame to meet the requirements for the dynamic property and the endurance mileage of the entire vehicle.

For the following problems: all electric commercial vehicles in China are refitted from traditional fuel vehicles; the arrangement position of the power cell compartment is unreasonable; the entire vehicle is poor in handling stability and driving safety; the aluminum alloy frame of the commercial vehicle adopts the longitudinal and cross beam section structure of the steel frame, and is only a simple replacement for the material and structure; and no brand-new longitudinal and cross beam section structure is designed for the aluminum alloy frame of the commercial vehicle according to the characteristics of the aluminum alloy material and the characteristics of the forming process, a brand-new frame and power cell compartment integration structural form is invented for the electric commercial vehicle, which is applicable to being mounted on a commercial vehicle with an electric drive axle, an electric transmission system and a distributed drive electric wheel. This structure can significantly reduce the height of the center of mass of the electric commercial vehicle, improve the distribution of an axle load, better protect a power cell system, improve the handling stability and driving safety of the entire vehicle, facilitates charging and cell replacement, and has an important leading function of promoting the electric commercial vehicle in China to be developed from a refitted carrying architecture to a brand-new architecture.

It should be noted that for those skilled in the art, it is apparent that the present disclosure is not limited to the details of the demonstrative embodiments mentioned above, and that the present disclosure can be realized in other specific forms without departing from the spirit or basic features of the present disclosure. Therefore, from any point of view, the embodiments should be regarded as exemplary and non-limiting. The scope of the present disclosure is defined by the appended claims rather than the above description. Therefore, all changes falling within the meanings and scope of equivalent elements of the claims are intended to be included in the present disclosure, and any reference sign in the claims shall not be regarded as limiting claims involved.

The principle and implementation modes of the present disclosure are described by applying specific examples in the present disclosure. The descriptions of the above embodiments are only intended to help to understand the method of the present disclosure and a core idea of the method. In addition, those ordinarily skilled in the art can make changes to the specific implementation modes and the application scope according to the idea of the present disclosure. From the above, the contents of this specification shall not be deemed as limitations to the present disclosure.

What is claimed is:

1. An aluminum alloy frame and power cell compartment integration structure, comprising an aluminum alloy frame and a power cell compartment, wherein the aluminum alloy frame comprises left and right longitudinal beams and several cross beams; the several cross beams are arranged between the left and right longitudinal beams in a spacing manner; the number and structural forms of the cross beams are made to be different structural forms according to a connection manner of all assembly parts and a frame and a carrying requirement; the power cell compartment comprises left and right supports, a bottom plate, a framework, an upper cover, and a charging port; the left and right supports, the upper cover and the bottom plate are respectively mounted on two side surfaces, a top and a bottom of the framework; a power cell is assembled in the framework of the power cell compartment; the charging port connected to the power cell is formed in the framework; a width of the power cell compartment is consistent with an internal width between the left and right longitudinal beams of the aluminum alloy frame; and the power cell compartment is detachably assembled between the left and right longitudinal beams of the aluminum alloy frame through the left and right supports on the two side surfaces of the framework.

2. The aluminum alloy frame and power cell compartment integration structure according to claim 1, wherein the left and right longitudinal beams of the aluminum alloy frame are inverted H-shaped sections; front ends of the left and right longitudinal beams are outwards bent to be broadened, so that the aluminum alloy frame is formed into a shape with a wider front part and a narrower rear part; and the power cell compartment is mounted in the broadened area of the aluminum alloy frame.

3. The aluminum alloy frame and power cell compartment integration structure according to claim 1, wherein when the power cell compartment is required to be placed between a front axle and a second axle of a commercial vehicle, the left and right longitudinal beams of the aluminum alloy frame located between the front axle and the second axle are required to be outwards bent to be broadened, so that the aluminum alloy frame is formed into a shape with two narrower ends and a wider middle part; and the power cell compartment is mounted in the broadened area of the aluminum alloy frame.

4. The aluminum alloy frame and power cell compartment integration structure according to claim 1, wherein for an electric truck, the cross beams of the aluminum alloy frame comprises a front end beam, a lower cross beam, a first cross beam, a second cross beam, a round girder I, a round girder II, a third cross beam, a fourth cross beam, a rear end beam, and connecting members; the front end beam is groove-shaped; the lower cross beam is a hollow ribbed plate; the first cross beam is in an inverted H shape with an upper right flange moving down; the second cross beam is in an inverted H shape; the round girder I and the round girder II are concave beams with ribs between an upper plate and a lower plate; the third cross beam and the fourth cross beam are inverted H-shaped beams; the rear end beam is a groove-shaped beam; and the connecting members are groove-shaped members.

5. The aluminum alloy frame and power cell compartment integration structure according to claim 1, wherein the left and right longitudinal beams and the various cross beams of the aluminum alloy frame are all manufactured by performing extrusion forming on aluminum alloy.

6. The aluminum alloy frame and power cell compartment integration structure according to claim 1, wherein the left and right longitudinal beams and the various cross beams of the aluminum alloy frame are connected through the connecting members or are directly screwed or riveted together.

7. The aluminum alloy frame and power cell compartment integration structure according to claim 1, wherein when the power cell compartment is located at the front end of the aluminum alloy frame, the power cell compartment further comprises a pull handle; and the pull handle is used for forwards pulling out the power cell compartment from the position between the left and right longitudinal beams of the aluminum alloy frame for cell replacement.

\* \* \* \* \*